Sept. 21, 1965 J. F. KRUY 3,207,929

BISTABLE TUNNEL DIODE AND STEERING CIRCUIT

Filed Dec. 24, 1962

INVENTOR.
JOSEPH F. KRUY
BY Henry L. Hanson
ATTORNEY

United States Patent Office 3,207,929

Patented Sept. 21, 1965

3,207,929

BISTABLE TUNNEL DIODE AND STEERING CIRCUIT

Joseph F. Kruy, West Newton, Mass., assignor to Honeywell Inc., a corporation of Delaware
Filed Dec. 24, 1962, Ser. No. 246,737
12 Claims. (Cl. 307—88.5)

Figure 1:
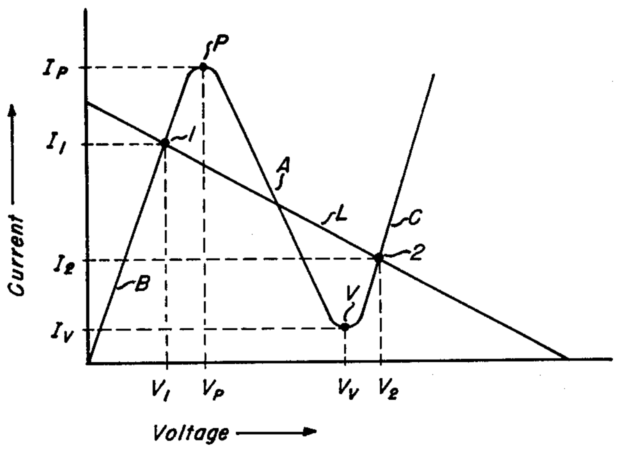

This invention relates in general to electronic switching apparatus and in particular to an improved trigger circuit employing a negative-resistance semi-conductor device, such as a tunnel diode.

A tunnel diode is basically a two terminal narrow-barrier semi-conductor junction device which, upon application of low values of forward biasing potential, exhibits a negative-resistance region intermediate a pair of positive-resistance ranges. Such a device is readily adapted for use as an information storage element in data processing equipment. For example, by a proper choice of circuit parameters it becomes possible to establish an operating load line which intersects the characteristic curve of the tunnel diode in each of its positive-resistance ranges. A pair of stable voltage-current conditions is thus formed which may be representative of stored units of binary information.

Heretofore, such bistable tunnel diode circuits have been switched from one stable state to the other by means of bipolar input pulses coupled to one terminal of the tunnel diode, whereby the current therethrough is momentarily shifted to values which exceed the adjacent instability current levels. Quite often however, such bipolar input pulses are not readily available and are obtained only at the expense of additional switching and timing circuitry.

It is therefore an object of the present invention to provide a bistable tunnel diode trigger circuit which is alternately switched between a pair of stable conductive states by means of unipolar input signals.

Another object of the present invention is to provide a bistable tunnel diode circuit which is alternately switched between a pair of stable conductive states upon the application of unipolar input signals to a common input terminal.

A further object of the present invention is to provide a pulse steering circuit capable of routing successive unipolar input pulses to opposite terminals of a negative-resistance diode, whereby the diode is alternately switched between a pair of stable operating conditions.

The foregoing objects of the invention are achieved by a unique input signal-coupling arrangement for controlling a bistable tunnel diode circuit. This signal-coupling arrangement utilizes the combined current-voltage characteristics of a tunnel diode, when in one or the other of its bistable states, and the conducting threshold differences of a pair of separate input circuits, the latter of which effectively steer the input switching pulses to one end or the other of the tunnel diode in accordance with the then active bistable state of the tunnel diode.

Still another object of the invention is then to provide a new and improved control circuit for a bistable tunnel diode circuit wherein the control circuit comprises at least a pair of input signal-coupling circuits coupled to opposite ends of a tunnel diode and having conducting thresholds that are substantially different so that a signal on an input terminal will pass to said tunnel diode in accordance with the bistable state of the tunnel diode and the relative conducting thresholds of the input coupling circuits.

Figure 2:
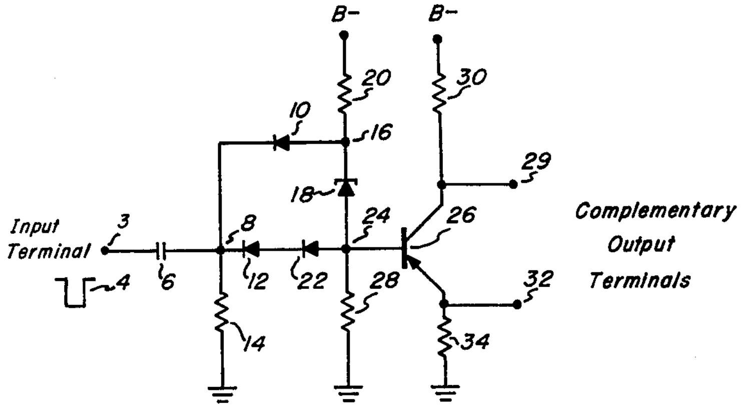

The various novel features which characterize the invention are pointed out with particularity in the claims annexed to and forming a part of the specification. For a better understanding of the invention, its advantages and specific objects thereof, reference should be had to the following detailed description and the accompanying drawing in which:

FIGURE 1 illustrates the current-voltage characteristic curve of a negative-resistance device, such as a tunnel diode; and FIGURE 2 is a diagrammatic representation of a preferred embodiment of the present invention.

In describing the operation of the embodiment of the invention shown in FIGURE 2, reference will be made to the tunnel diode characteristic curve illustrated in FIGURE 1. It will be noted from this curve that the tunnel diode exhibits a negative-resistance region A separated from a pair of positive-resistance ranges B and C by a pair of instability points P and V respectively. A proper selection of biasing voltage and series resistance provides a D.C. load line L which intersects each of the positive-resistance ranges of the characteristic curve, specifically at the stable operating points 1 and 2.

When the tunnel diode is set to the stable operating point 1, there exists a quiescent voltage drop $V_1$ across it and a quiescent current $I_1$ therethrough. If an additional additive current is momentarily supplied to the tunnel diode which, in combination with the quiescent current $I_1$ exceeds the instability current $I_p$, the operating point of the tunnel diode will shift instantaneously to the positive-resistance range C. Upon termination of the additive current pulse, the operating point of the tunnel diode will settle at the stable operating point 2. A larger voltage drop $V_2$ now exists across the tunnel diode while a much smaller current $I_2$ flows through it. A subsequent reduction in current through the tunnel diode below the instability current level $I_v$ will thereafter cause the operating point to revert to the positive-resistance range B at the stable operating point 1.

Referring now to FIGURE 2, there is shown a bistable trigger circuit having an input terminal 3, which is adapted to couple unipolar input signals, such as that illustrated by the waveform 4 to one end of a condenser 6. The other end of condenser 6 is connected to the junction point 8 of the cathode of a semi-conductor diode 10, the cathode of a semi-conductor diode 12 and one terminal of a resistor 14, the latter having its other terminal connected to a ground reference point.

The anode of diode 10 is connected to the junction point 16 of the cathode of a tunnel diode 18 and one terminal of a resistor 20, the latter having its other terminal connected to a negative-voltage source B—. The anode of diode 12 is connected to the cathode of a diode 22 which in turn has its anode connected to the junction point 24 of the anode of tunnel diode 18, the base of a transistor 26 and one terminal of a resistor 28. The latter has its other terminal connected to the ground reference point. The collector of transistor 26 is connected to an output terminal 29 and is further coupled to the aforesaid B— source by means of a collector resistor 30. The emitter of transistor 26 is connected to an output terminal 32 and is further coupled to the ground reference point by way of an emitter resistor 34.

In operation, the tunnel diode 18 is forward-biased by way of the B— source, in conjunction with the series connected resistors 20 and 28 to form a D.C. load line such as the load line L of FIGURE 1, which intersects each of the positive resistance ranges of the tunnel diode characteristic curve. It will be initially assumed that the tunnel diode is set to the stable operating point 1 of FIGURE 1, and that the current $I_1$ which flows through the tunnel diode 18 and resistor 28, establishes a voltage drop across the latter which is of sufficient magnitude to energize the transistor 26. Under these conditions, the output signals on the output terminals 29 and 32 will go positive and negative respectively to establish a first pair of complementary output signals.

When it is desired to switch the trigger circuit to its other stable state, a negative-going input signal, such as that illustrated by the reference numeral 4, is applied to the input terminal 3. This signal is differentiated by the combined action of the condenser 6 and the resistor 8 to form a steep negative pulse of short duration at the junction point 8. Two signal paths are made available for steering the aforementioned pulse from the junction point 8 to the junction point 24 and thence to ground via the resistor 28. The first path includes the semi-conductor diode 10 and the tunnel diode 18, while the second path includes the like-poled semi-conductor diodes 12 and 22.

Each of the aforementioned pulse-steering paths presents a high impedance to signal flow therethrough until such times as the magnitude of the applied negative pulse exceeds the forward conduction threshold level of its associated diodes. The forward conduction threshold level of a diode may be defined as that value of forward biasing potential which must be applied thereacross in order to exceed the knee or break point portion of its characteristic curve, where its impedance changes abruptly from a high to a low value. It will be noted from FIGURE 2 of the drawing that the diode 10 is reverse-biased with respect to the diodes 12 and 22 by the voltage drop across the tunnel diode 18. It would appear therefore, that an applied negative pulse at the junction point 8 would always be coupled to the junction point 24 via the diodes 12 and 22. In the present invention however, the diodes 12 and 22 have been selected to have a combined forward conduction threshold level which is greater than the magnitude of the applied signal necessary to exceed the forward conduction threshold level of the diode 10, in instances when the tunnel diode 18 is set to its low voltage state. Furthermore, the diodes 12 and 22 have been selected to have a combined conduction threshold level which is less than the magnitude required for an applied signal to exceed the forward conduction threshold level of the diode 10, in instances when the tunnel diode 18 is set to its high voltage state. Stated briefly, when the tunnel diode 18 is set to its low voltage state, an applied input signal will always be coupled to the junction point 24 via the diode 10 and the tunnel diode 18. On the other hand, when the tunnel diode 18 is set to its high voltage stable state, an applied input signal will always be coupled to the junction point 24 via the diodes 12 and 22. Once the forward conduction threshold level of the diodes in one of the pulse steering paths between the junction points 8 and 24 has been reached, the low impedance thereof will limit the voltage applied across the diodes associated with the other path to a value below their forward conduction threshold level. Thus, the second path will present a high impedance for signal flow therethrough for the duration of the applied input signal.

As an example, each of the diodes 10, 12 and 22 may be germanium diodes having a forward conduction threshold level approximating 0.25 volt. The combined threshold level of the diodes 12 and 22 is therefore 0.5 volt. The tunnel diode 18 may be selected and biased to have a low voltage stable state of 0.05 volt and a high voltage stable state of 0.45 volt. The magnitude of an input signal required to exceed the conduction level between the junction points 8 and the junction point 24 will always be 0.5 volt through the path which includes the diodes 12 and 22. The conduction level through the diode 10 and tunnel diode 18 on the other hand, will be approximately 0.3 volt when the tunnel diode is set to its low voltage stable state and 0.7 volt when the tunnel diode is set to its high voltage stable state. Thus, a difference in conduction levels of 0.2 volt exists in favor of one steering path or the other, depending upon the state of the tunnel diode 18.

As previously mentioned, the tunnel diode 18 is initially assumed to be in its low voltage state, as illustrated by the operating point 1 of FIGURE 1. A differentiated input signal at the junction point 8 will therefore be coupled through diode 10 and the tunnel diode 18 to the junction point 24, and thence through the resistor 28 to ground. This additional current pulse through the tunnel diode 18 is sufficient to exceed the instability current level $I_p$ whereupon the tunnel diode is instantaneously switched to its high voltage stable state, illustrated by operating point 2 of FIGURE 1. Upon switching, the decrease in current through the tunnel diode 18 decreases the voltage drop across the resistor 28 to a value whereby the transistor 26 is rendered nonconductive. The output signals on the complementary output terminals 29 and 32 therefore approach B— in ground potential respectively to provide a second pair of complementary output signals.

The switching of the tunnel diode 18 to its high voltage state provides a larger voltage drop $V_2$ thereacross, as illustrated by the point 2 of FIGURE 1. Upon application of the succeeding unipolar input signal at the input terminal 3, the differentiated pulse formed at the junction point 8 will therefore be coupled through the diodes 12 and 22 to the junction point 24, and thence through the resistor 28 to ground. The additional current through the resistor 28 establishes a negative voltage drop across it which is sufficient to reduce the current through the tunnel diode 18 to a level below its instability current level $I_v$. The operating point of the tunnel diode therefore reverts to the initially chosen stable operating point 1, to provide the output signal conditions initially observed at the terminals 29 and 32. A complete switching cycle is thus established by means of successively applied unipolar input signals, rather than by means of successively applied input signals of alternate polarity as was heretofore required.

It will be appreciated that the diodes 12 and 22 may be replaced by a single diode, provided that the forward conduction threshold level of the diode is greater than the conduction level of the steering path which includes the diode 10, in instances where the tunnel diode is set to its low voltage state, and is less than the conduction level of the steering path which includes the diode 10 in instances when the tunnel diode 18 is set to its high voltage state. The diode 10, for example, may be a germanium diode while the diodes 12 and 22 may be replaced by a single diode which exhibits the required higher forward conduction threshold level, such as a silicon diode. If the signal gain and isolation properties of a transistor are not required, output signals may be coupled directly from the terminals of the tunnel diode 18.

While, in accordance with the provisions of the statutes, there has been illustrated and described the best forms of the invention known, it will be apparent to those skilled in the art that changes may be made in the apparatus described without departing from the spirit of the invention set forth in the appended claims and that, in some cases, certain features of the invention may be used to advantage without a corresponding use of other features.

Having now described the invention, what is claimed as new and novel and for which it is desired to secure Letters Patent is:

1. A trigger circuit comprising a tunnel diode having an anode and a cathode, a D.C. voltage source having a negative and a positive terminal, said positive terminal being connected to a ground reference point, means for biasing said tunnel diode for bistable operation, said biasing means including a first resistor connected between the anode of said tunnel diode and said reference point and a second resistor connected between the cathode of said tunnel diode and the negative terminal of said D.C. voltage source, a first diode having its anode connected to the cathode of said tunnel diode and its cathode connected to a junction point, a like-poled series diode combination having a threshold of conduction different from that of said first diode, said diode combination having its free anode terminal connected to the anode of said tunnel diode and its free cathode terminal connected to said junction point, an input terminal, a signal differentiating network connected between said input terminal and said junction point, and an output terminal connected to the anode of said tunnel diode, said tunnel diode being adapted to be alternately switched between its bistable states upon application of unipolar signals to said input terminal.

2. A trigger circuit comprising a tunnel diode having an anode and a cathode, a negative voltage terminal, a ground reference point, means for biasing said tunnel diode for bistable operation, said biasing means including a first resistor connected between the anode of said tunnel diode and said reference point and a second resistor connected between the cathode of said tunnel diode and said negative voltage terminal, a first diode having its anode connected to the cathode of said tunnel diode and its cathode connected to a junction point, a like-poled series diode combination having a threshold of conduction different from that of said first diode, said diode combination having its free anode terminal connected to the anode of said tunnel diode and its free cathode terminal connected to said junction point, an input terminal, a signal differentiating network connected between said input terminal and said junction point, and an output terminal connected to the anode of said tunnel diode, said tunnel diode being adapted to be alternately switched between its bistable states upon application of unipolar input signals to said input terminal.

3. A trigger circuit comprising a tunnel diode having an anode and a cathode, means for biasing said tunnel diode for bistable operation, said biasing means including a first resistive impedance connected between the anode of said tunnel diode and a reference point and a second resistive impedance connected between the cathode of said tunnel diode and a negative voltage terminal, a first diode having its anode connected to the cathode of said tunnel diode and its cathode connected to a junction point, a like-poled series diode combination having a threshold of conduction different from that of said first diode, said diode combination having its free anode terminal connected to the anode of said tunnel diode and its free cathode terminal connected to said junction point, an input terminal, a signal differentiating network connected between said input terminal and said junction point, and an output terminal connected to the anode of said tunnel diode, said tunnel diode being adapted to be alternately switched between its bistable states upon application of unipolar input signals to said input terminal.

4. A trigger circuit comprising a tunnel diode having an anode and a cathode, means for biasing said tunnel diode for bistable operation, said biasing means including a first resistive impedance connected between the anode of said tunnel diode and a reference point and a second resistive impedance connected between the cathode of said tunnel diode and a negative voltage terminal, a first diode having its anode connected to the cathode of said tunnel diode and its cathode connected to a junction point, a like-poled series diode combination having a threshold of conduction different from that of said first diode, said diode combination having its free anode terminal connected to the anode of said tunnel diode and its free cathode terminal connected to said junction point, and an output terminal connected to the anode of said tunnel diode, said tunnel diode being adapted to be alternately switched between its bistable states upon application of unipolar input pulses to said junction point.

5. A trigger circuit comprising a tunnel diode having an anode and a cathode, means for biasing said tunnel diode for bistable operation, said biasing means including a first resistive impedance connected between the anode of said tunnel diode and a reference point and a second resistive impedance connected between the cathode of said tunnel diode and a negative voltage terminal, a first diode having its anode connected to the cathode of said tunnel diode and its cathode connected to a junction point, a second diode having its anode terminal connected to the anode of said tunnel diode and its cathode terminal connected to said junction point, said second diode having a forward conduction threshold level greater than said first diode, and an output terminal connected to the anode of said tunnel diode, said tunnel diode being adapted to be alternately switched between its bistable states upon application of unipolar input pulses to said junction point.

6. Apparatus as described in claim 5 wherein said first diode is a germanium diode and said second diode is a silicon diode.

7. A trigger circuit comprising a negative resistance diode having a characteristic curve which exhibits a negative resistance region intermediate a pair of positive resistance ranges, means for biasing said negative resistance diode for bistable operation, said biasing means including a first impedance connected between the anode of said negative resistance diode and a reference point and a second impedance connected between the cathode of said negative resistance diode and a negative biasing source, a first diode having its anode connected to the cathode of said negative resistance diode and its cathode connected to a junction point, a second diode having its anode terminal connected to the anode of said negative resistance diode and its cathode terminal connected to said junction point, and means for deriving bilevel output signals from said negative resistance diode, in response to the application of unipolar input pulses to said junction point.

8. A bistable circuit comprising a tunnel diode connected to operate in a bistable mode of operation, and a pair of unilateral direct-current input circuits coupled to opposite ends of said tunnel diode, means for establishing different thresholds of conduction in said input circuits respectively, said input circuits being jointly connected to a common input terminal to which a series of sequentially occurring unipolar pulses may be applied to effectively switch said tunnel diode between its two stable states.

9. A bistable trigger circuit comprising a tunnel diode connected to a source of power by way of impedance means so that said tunnel diode may be switched between one or the other of two stable states, a pair of unilateral direct-current input circuits coupled to opposite ends of said tunnel diode and being jointly connected to a common input terminal, means for establishing different thresholds of conduction in said input circuits respectively, and a unipolar input signal source connected to said common input terminal to switch said tunnel diode alternately between its two stable states with each sequentially occurring input unipolar pulse.

10. A signal steering circuit comprising a tunnel diode, a pair of power supply terminals, impedance means connecting said tunnel diode to said power supply terminals so that current will flow therethrough and said tunnel diode may be switched between one or the other of two stable states as determined by the impedance of said connecting means, a pair of input circuits having a common input terminal and each having an output terminal connected to the opposite terminals of said tunnel diode, said pair of input circuits having diodes therein whose conducting thresholds are different from each other by a factor of at least two, means coupling a unipolar input pulse to said common input terminal for effective coupling to one end or the other of said tunnel diode in accordance with the relative conducting thresholds of said input circuits and the then current bistable state of said tunnel diode.

11. A circuit for coupling input pulses from a common input terminal to a common output terminal comprising a first circuit coupled between said input and output terminals, said first circuit comprising a pair of diodes, one of which has a pair of bistable operating voltage points of a first and second magnitude and the other of which has a predetermined voltage threshold of conduction, and a second circuit connected in parallel with said first circuit and comprising diode means having a conducting voltage threshold which is of a magnitude greater than the first voltage magniture of said one diode when in a first bistable state combined with the predetermined voltage threshold of conduction of said other diode and less than the second voltage magnitude of said one diode when in its second bistable state combined with the predetermined voltage threshold of conduction of said other diode.

12. A trigger circuit comprising a tunnel diode having an anode and a cathode, a D.C. voltage source having a negative and a positive terminal, said positive terminal being connected to a ground reference point, means for biasing said tunnel diode for bistable operation, said biasing means including a first resistor connected between the anode of said tunnel diode and said reference point and a second resistor connected between the cathode of said tunnel diode and the negative terminal of said D.C. voltage source, a first diode having its anode connected to the cathode of said tunnel diode and its cathode connected to a junction point, a like-poled series diode combination having a threshold of conduction different from that of said first diode, said diode combination having its free anode terminal connected to the anode of said tunnel diode and its free cathode terminal connected to said junction point, an input terminal, a signal differentiating network connected between said input terminal and said junction point, a PNP type transistor having its base element connected to the anode of said tunnel diode, means for resistively coupling the collector and emitter element of said transistor to the negative terminal of said D.C. source and said reference point respectively and means for coupling a pair of output signals from the collector and emitter elements of said transistor respectively.

References Cited by the Examiner

UNITED STATES PATENTS

| | | | |
|---|---|---|---|
| 2,986,652 | 5/61 | Eachus | 307—88.5 |
| 3,061,743 | 10/62 | Hatsuaki Fukui et al. | 307—88.5 |

OTHER REFERENCES

Hemel: A Study of Tunnel Diodes For Digital Electronics Circuits, March 1962.

JOHN W. HUCKERT, *Primary Examiner.*

DAVID J. GALVIN, *Examiner.*